US008077020B2

(12) United States Patent
Behm et al.

(10) Patent No.: US 8,077,020 B2

(45) Date of Patent: Dec. 13, 2011

(54) METHOD AND APPARATUS FOR TACTILE HAPTIC DEVICE TO GUIDE USER IN REAL-TIME OBSTACLE AVOIDANCE

(75) Inventors: Gary W. Behm, Hopewell Junction, NY (US); Richard E. Von Mering, Pine Bush, NY (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/170,693

(22) Filed: Jul. 10, 2008

(65) Prior Publication Data

US 2010/0007474 A1 Jan. 14, 2010

(51) Int. Cl.
*H04B 3/36* (2006.01)

(52) U.S. Cl. ................. 340/407.1; 340/573.1; 340/4.12; 367/99; 367/116; 342/24; 135/911; 434/112; 434/114

(58) Field of Classification Search ............... 340/407.1, 340/573.1, 825.46; 367/99, 116, 910; 342/24; 135/911; 434/112, 114; 250/224
See application file for complete search history.

(56) References Cited

U.S. PATENT DOCUMENTS

| | | | | |
|---|---|---|---|---|
| 4,712,003 | A * | 12/1987 | Ban et al. | 250/221 |
| 5,097,856 | A * | 3/1992 | Chi-Sheng | 135/72 |
| 5,687,136 | A * | 11/1997 | Borenstein | 367/116 |
| 2005/0085299 | A1 * | 4/2005 | Murzanski et al. | 463/38 |

* cited by examiner

*Primary Examiner* — Jennifer Mehmood
*Assistant Examiner* — Hongmin Fan
(74) *Attorney, Agent, or Firm* — Cantor Colburn LLP; Wenjie Li

(57) ABSTRACT

An apparatus for providing information about a physical surrounding environment to a user includes an elongate body having first and second opposing ends and a mast, at least one sensor mountably coupled to the mast, at least one dual purpose, bi-directional haptic force feedback device including first and second haptic force feedback mechanisms and a vibrator, and a processor, which receives signals from the at least one sensor and operatively controls the at least one dual purpose, bi-directional haptic force feedback device.

18 Claims, 9 Drawing Sheets

METHOD AND APPARATUS FOR TACTILE HAPTIC DEVICE TO GUIDE USER IN REAL-TIME OBSTACLE AVOIDANCE

BACKGROUND

The present invention relates generally to an apparatus for sensing of three-dimensional environmental information and a method of operating the same, more particularly, to an apparatus which provides information about a person's surroundings through a tactile output and a method of operating the same.

Currently, nearly 300,000 blind and visually impaired people in the United States use conventional mobility canes which provide a very limited amount of information about their surrounding environment. A conventional mobility cane only provides information about the space surrounding a user that may be physically touched by the cane.

Various apparatus have been developed to provide blind people with information about the surrounding environment beyond the physical reach of the conventional cane. These devices typically rely on an acoustic element to provide information to the user. One example of such a device is an acoustic cane that provides sensing information through sound feedback, e.g., echolocation. The acoustic cane emits a noise that reflects, or echoes, from objects within the blind person's surrounding environment. The blind person then interprets the echoes to decipher the layout of the environment. Similarly, other devices may emit light and detect reflection of the emitted light from obstacles. These devices also rely on an audio signal such as a click or a variably pitched beep to convey obstacle detection information to the user.

Devices relying on an audio signal for information conveyance are not well suited for noisy environments such as heavily trafficked streets where audible signals are difficult to detect and interpret. These devices are especially ill suited for deaf and blind individuals who are incapable of hearing the audio signals. Furthermore, the acoustic cane and other audio devices include that they may draw unwanted attention to the user and or interfere with the user's sense of hearing.

Accordingly, it is desirable to provide a method and apparatus for increasing the information gathering range of blind or blind and deaf people beyond the range of a conventional cane and supplying the gathered information to the user in real time, and in a way which may be easily perceived in high noise level environments by both hearing and non-hearing individuals.

SUMMARY

The foregoing discussed drawbacks and deficiencies of the prior art are overcome or alleviated, in an exemplary embodiment, by an apparatus for providing information about a physical surrounding environment to a user. The apparatus includes an elongate body having first and second opposing ends and a mast extending transversely from a body centerline at a location thereof proximate to the first end, the second end being handled by the user to repeatedly and continuously sweep the first end in first and second opposite motions, at least one sensor mountably coupled to the mast of the body, at least one dual purpose, bi-directional haptic force feedback device coupled to the body proximate to the second end and including first and second haptic force feedback mechanisms and a vibrator, and a processor, which is coupled to the body intermediate the mast and the at least one dual purpose, bi-directional haptic force feedback device, and which receives signals from the at least one sensor and operatively controls the at least one dual purpose, bi-directional haptic force feedback device to convey a first type of information about the physical surrounding environment sensed by the at least one sensor during the sweeping of the first end in the first and second motions by operating the vibrator and the first or the second haptic force feedback mechanisms, respectively, and convey a second type of information about the physical surrounding environment sensed by the at least one sensor during the sweeping of the first end in the first or second motions by operating the vibrator, the first and the second haptic force feedback mechanisms.

In another exemplary embodiment, a method of providing information about a physical surrounding environment to a user provided with an elongate body having first and second opposing ends and a mast extending from a body centerline at a location proximate to the first end the second end being handled by the user to repeatedly and continuously sweep the first end in first and second opposite motions is provided. The method includes transmitting at least one sensing signal emitted by a sensor mountably coupled to the mast to the physical surrounding environment, receiving a modified sensing signal at the sensor during the sweeping from the physical surrounding environment and controlling first and second haptic force feedback mechanisms coupled to the body proximate to the second end and a vibrator, the controlling being based on the modified sensing signal to convey a first type of information about the physical surrounding environment sensed during the sweeping of the first end in the first and second motions by operating the vibrator and the first or the second haptic force feedback mechanisms, respectively, and convey a second type of information about the physical surrounding environment sensed during the sweeping of the first end in the first or second motions by operating the vibrator, the first and the second haptic force feedback mechanisms.

In another exemplary embodiment, an apparatus for providing information about a physical surrounding environment to a user includes an elongate body having a handle, a distal end a mast extending transversely from the distal end, the handle handled by the user to repeatedly and continuously sweep the distal end in opposite motions, at least one sensor mountably coupled to the mast and operatively coupled to the handle, first and second haptic force feedback mechanisms proximally coupled to the handle, a vibrator proximally coupled to the handle and a processor, which is coupled to the body intermediate the mast and the plurality of mechanisms, and which receives signals from the at least one sensor and controls force feedback of the plurality of mechanisms and vibration of the vibrator to convey a first type of information about the physical surrounding environment sensed by the at least one sensor during the sweeping in each of the opposite motions by operating the vibrator and the first or the second haptic force feedback mechanisms, respectively, and convey a second type of information about the physical surrounding environment sensed by the at least one sensor during the sweeping in both of the opposite motions by operating the vibrator, the first and the second haptic force feedback mechanisms.

BRIEF DESCRIPTION OF THE DRAWINGS

Referring to the exemplary drawings wherein like elements are numbered alike in the several Figures.

DETAILED DESCRIPTION

Disclosed herein is an apparatus for increasing the information gathering range of blind or blind and deaf people beyond the range of a conventional mobility cane and supplying the gathered information to the user in real time and in a way which may be easily perceived in high noise level environments by both hearing and non-hearing individuals and a method of operating the same. Briefly stated, a combination of infrared and ultrasonic sensing information is processed to control the intensity and direction of a force feedback and/or vibration on a tactile pad of a walking cane. In so doing, three-dimensional information about the surrounding environment may be provided to a user. Furthermore, the tactile feedback mechanism may be used in high noise environments and by users with limited hearing.

Referring now to FIGS. 1-4, there is shown a side perspective view of an exemplary embodiment of an apparatus 1 for sensing of a three-dimensional environment according to the present invention, a schematic magnified bottom perspective view illustrating the handle of the apparatus 1, a schematic magnified bottom perspective view illustrating an exemplary embodiment of a force feedback device of the apparatus 1, a cross-sectional view of the apparatus 1 and a top plan perspective view illustrating the sensors of the apparatus 1, respectively.

Figure 1:
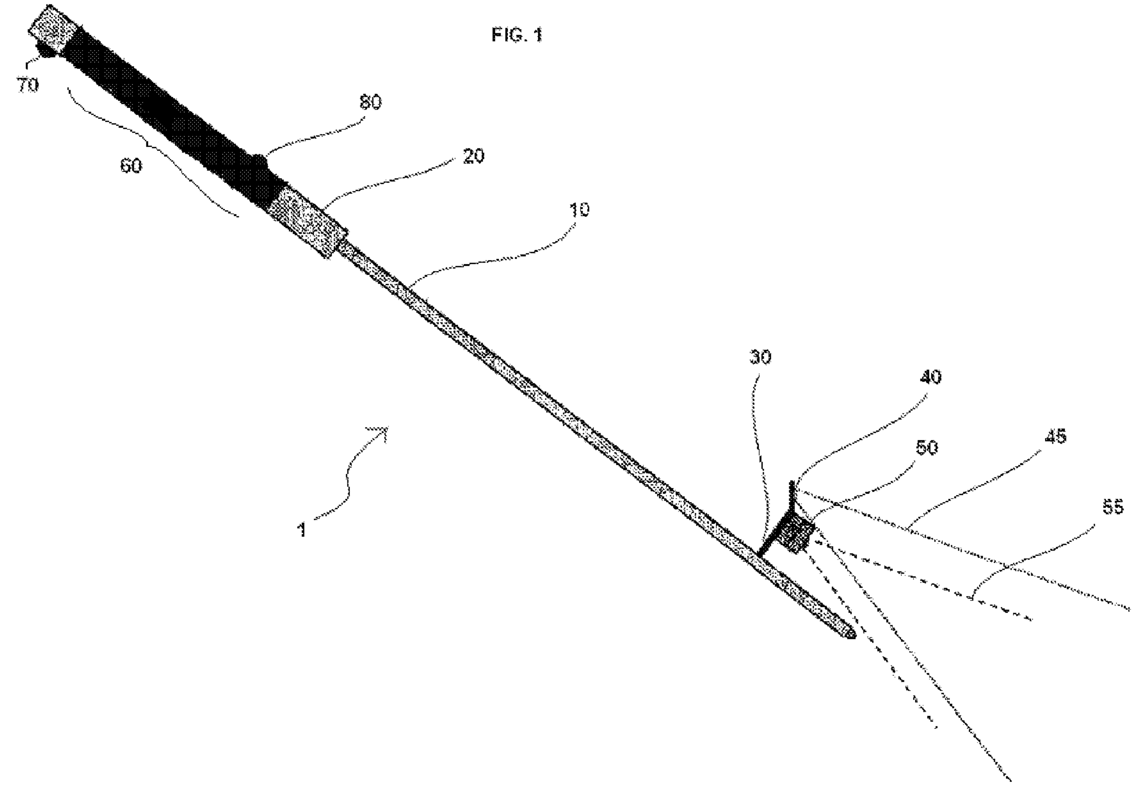
FIG. 1 is a side perspective view of an exemplary embodiment of an apparatus for sensing of a three-dimensional environment according to the present invention.
Figure 4:
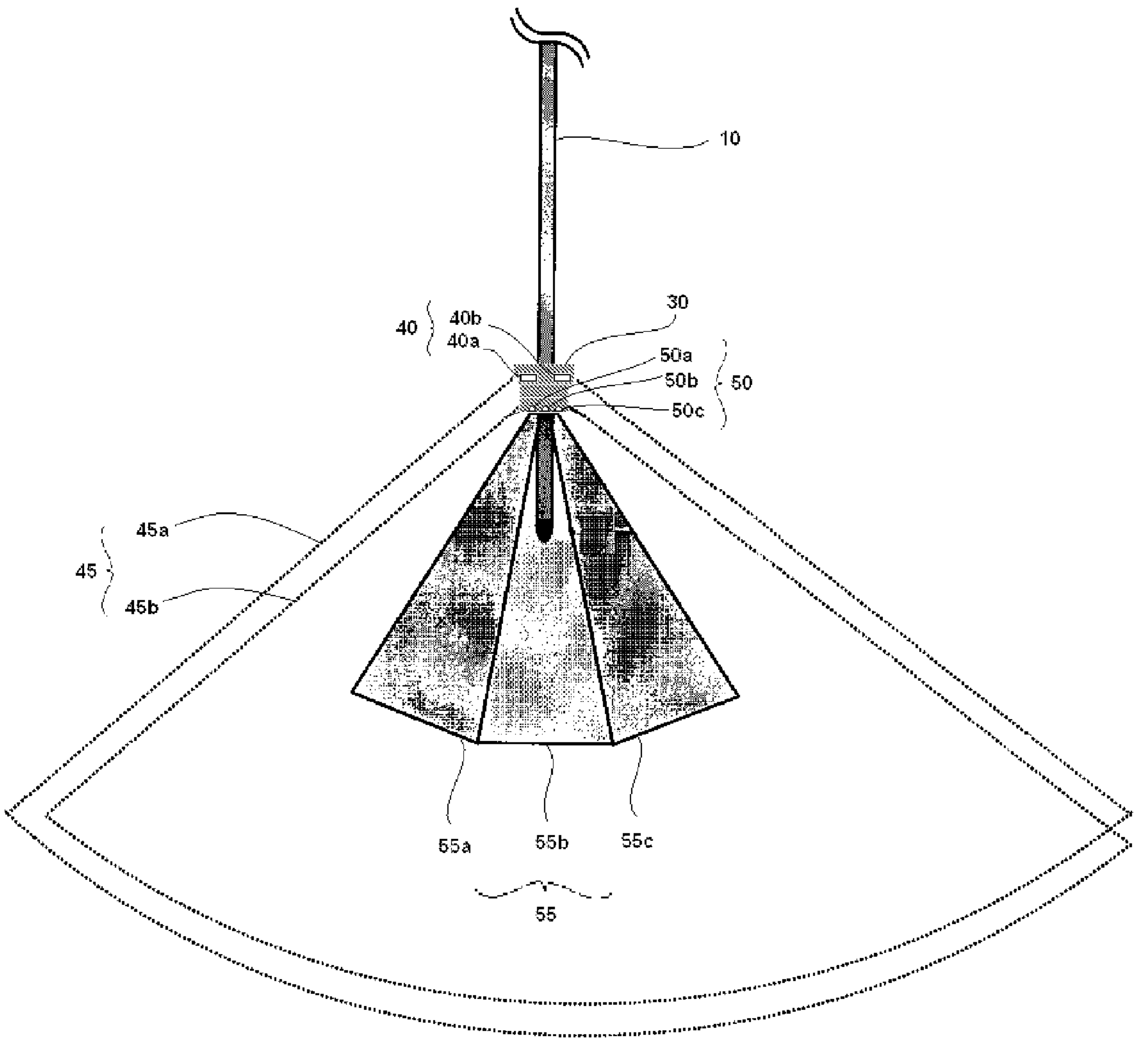
FIG. 4 is a schematic top perspective view illustrating sensor ranges of the exemplary embodiment of an apparatus of FIG. 1.

As shown in FIG. 1, an exemplary embodiment of an apparatus 1 includes a shaft 10 connected to a handle 20, similar to a conventional mobility cane. However, unlike a conventional mobility cane, the present apparatus 1 includes a sensor mast 30. The sensor mast 30 may serve as a mount for a wide array of sensor apparatus as commonly known in the art. As shown in FIG. 4, in the present exemplary embodiment, the apparatus 1 includes an ultrasonic sensor 40, which includes first and second individual ultrasonic sensors 40*a* and 40*b*, respectively, to emit ultrasonic signals 45 including first and second ultrasonic signals 45*a* and 45*b*. The present exemplary embodiment also includes an infrared sensor 50, which includes first, second and third infrared sensors 50*a*, 50*b* and 50*c*, respectively, to emit infrared signals 55 including first, second and third infrared signals 55*a*, 55*b* and 55*c*. Both the ultrasonic sensor 40 and the infrared sensor 50 are mounted on the sensor mast 30. Alternative exemplary embodiments include configurations wherein only one sensing apparatus, e.g., only the ultrasonic sensor 40 or only the infrared sensor 50, are disposed on the sensing mast 30. Alternative exemplary embodiments also include configurations wherein alternative sensing apparatus, such as apparatus using lasers or radar, are mounted on the sensing mast 30.

As shown in FIG. 4, the sensors 40 and 50 emit signals 45 and 55, respectively, to the environment. The ultrasonic sensor 40 includes the first ultrasonic sensor 40*a* emitting the first ultrasonic signal 45*a* and the second ultrasonic sensor 40*b* emitting the second ultrasonic signal 45*b*. The first and second ultrasonic sensors 40*a* and 40*b* are slightly offset from one another so as to provide an offset signal range. The first, second and third infrared sensors 50*a*-*c* are similarly offset so the emitted infrared signals 55*a*, 55*b* and 55*c* are also offset in different directions. This provides the apparatus 1 with a broad range of sensor coverage.

The emitted signals are then reflected from objects in the environment, such as walls, columns, trees, etc., and the sensors 40 and 50 detect these reflected signals. Each sensor has a predetermined range for the detection of reflections. In one exemplary embodiment the infrared sensor 50 may detect objects at up to three feet away from the sensor and the ultrasonic sensor 40 may detect objects at up to ten feet away from the sensor. The detected signals are then processed by a processor as will be described in more detail below.

Figure 2A:
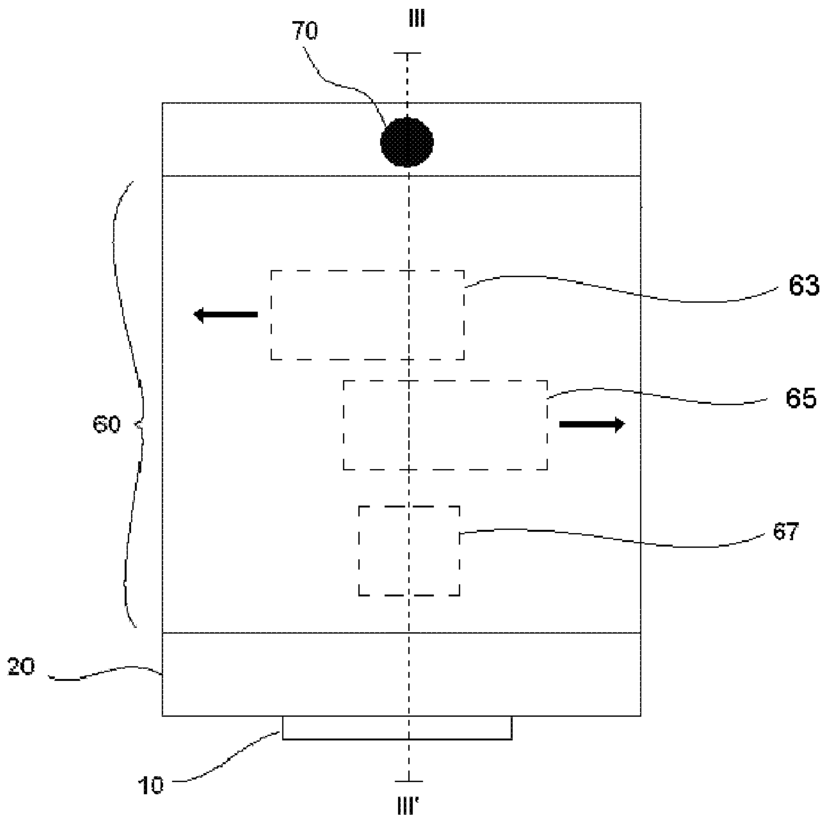
FIG. 2A is a schematic magnified bottom perspective view illustrating the handle of the exemplary embodiment of an apparatus of FIG. 1.
Figure 2B:
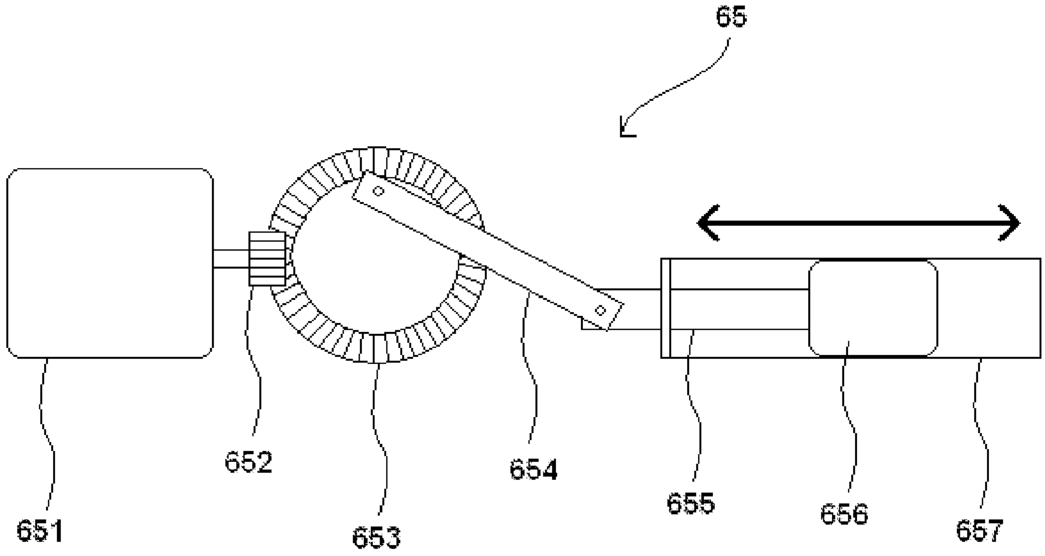
FIG. 2B is a schematic bottom perspective view illustrating an exemplary embodiment of a force feedback device of FIG. 2A.
Figure 3:
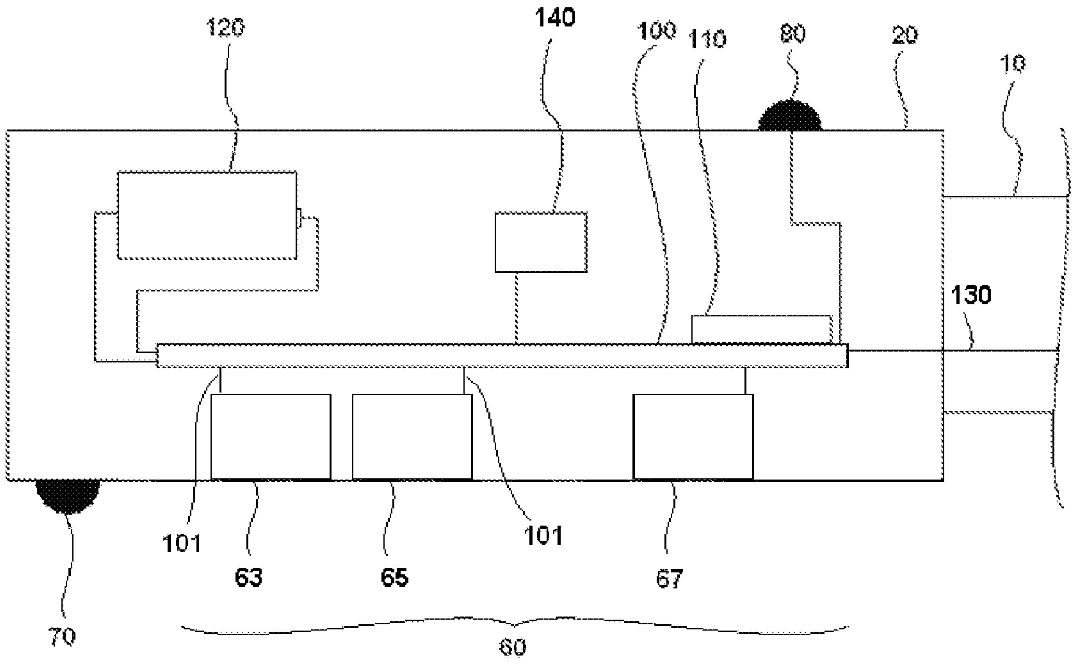
FIG. 3 is a schematic cross-sectional view of the exemplary embodiment of an apparatus taken along line III-III' of FIG. 2.

As shown in FIGS. 2A, 2B and 3, the present exemplary embodiment of an apparatus 1 also includes various modifications to the handle 20. The handle 20 includes a tactile pad 60, first and second dual purpose, bi-directional haptic force feedback devices 63 and 65 coupled to the tactile pad 60, a vibrator 67, a handle positioner 70, a reset button 80, and various additional components 140.

As shown in FIGS. 2A, 2B and 3, the handle 20 incorporates a tactile pad 60 coupled to the first and second dual purpose, bi-directional haptic force feedback devices 63 and 65 and a vibrator 67 which enable tactile feedback of information sensed from the sensors 40 and 50 positioned on the sensor mast 30, as shown in FIG. 1. The first dual-purpose, bi-directional haptic force feedback device 63 may be configured to provide tactile information in the form of a force in a first direction substantially perpendicular to a longitudinal axis of the apparatus 1 and the second dual purpose, bi-directional haptic force feedback device 65 may be configured to provide tactile information in the form of a force in a second direction substantially opposite to the first direction. For example, the force from the first dual purpose, bi-directional haptic force feedback device 63 may be applied to the left as shown by the arrow 1 in FIG. 2A and the force from the second dual purpose, bi-directional haptic force feedback and direction device 65 may be applied to the right as shown by arrow 2 in FIG. 2A.

The vibrator 67 may be configured to vibrate with a varying intensity as described in more detail below with reference to FIGS. 5A-9B. Alternative exemplary embodiments include configurations wherein the vibrator 67 is omitted.

FIG. 2B is a schematic bottom perspective view illustrating an exemplary embodiment of the second dual-purpose, bi-directional haptic force feedback device 65 of FIG. 2A. As shown in FIG. 2B, the dual-purpose, bi-directional haptic force feedback device 65 includes a motor 651 having a driveshaft ending in a first gear 652. In one exemplary embodiment, the motor 651 may be a servomotor. The first gear 652 forms a bevel gear system with a second gear 653. A first end of a linkage mechanism 654 is rotatably connected to the second gear 653 and a second end of the linkage mechanism 654 is rotatably connected to a connecting rod 655. The connecting rod 655 includes a weighted portion 656, which in one exemplary embodiment is disposed on an end of the connecting rod 655 distal to the rotatable connection with the linkage mechanism 654. At least the weighted portion of the connecting rod 655 is disposed in a cylinder 657. The position of the cylinder 657 is fixed within the handle 60, but the weighted portion 656 of the connecting rod 655 is free to move in a left-to-right motion as indicated by the arrows in FIG. 2B.

When power is applied to the motor 651 the drive shaft with the first gear 652 rotates in a first plane. The motion is transferred to rotate the second gear 653 in a second plane through the teeth of the first and second gears 652 and 653 in the bevel gear system. The rotation of the second gear 653 is then translated into linear motion of the connecting rod 655 by the linkage mechanism 654. The second dual-purpose, bi-directional haptic force feedback device 65 may exert a force on the handle 60 by rapidly accelerating the weighted portion 656 of the connecting rod 655 in one direction or another. The size of the force is directly proportional to the size of the acceleration of the weighted portion 656 of the connecting rod 655. Therefore, the dual-purpose, bi-directional haptic force feedback device 65 may exert a large or relatively small force on the handle 60 depending upon the power applied to the motor 651.

Although only the second dual-purpose haptic force feedback device 65 has been described, the first dual-purpose haptic force feedback device 63 may be substantially a mirror image of the second dual-purpose haptic force feedback device 65. Using two dual-purpose haptic force feedback devices 63 and 65, which are slightly offset from the centerline of the handle 60 as shown in FIG. 2A, provides additional tactile sensitivity. However, alternative exemplary embodiments also include configurations wherein only a single dual-purpose haptic force feedback device 65 is included in the handle 60. In such an alternative exemplary embodiment, the single dual-purpose, haptic force feedback device could be configured so as to be capable of producing equal forces in both the left and right directions.

The human body's ability to perceive sensation, specifically the movement of the limbs, also called kinaesthesia, allows a user to interpret the forces applied by the dual purpose, bi-directional haptic force feedback devices 63 and 65 as information corresponding to the user's surrounding physical environment. A user may perceive the forces applied by the dual purpose, bi-directional haptic force feedback devices 63 and 65 as a pushing or pulling force on the handle 20 directing the user away from a detected obstacle as will be described in more detail below. In one exemplary embodiment, the dual-purpose, bi-directional haptic force feedback devices 63 and 65 may be offset with respect to a centerline of the handle 20.

Alternative exemplary embodiments of the dual purpose, bi-directional haptic force feedback devices 63 and 65 may include any apparatus capable of providing a tactile feedback having variable intensity as would be known to one of ordinary skill in the art.

In FIG. 3, the dual purpose, bi-directional haptic force feedback devices 63 and 65 and the vibrator 67 are connected to a circuit board 100 through electrical connections 101. The circuit board 100 is also electrically connected to a processor 110, a power supply 120, the reset button 80, and the sensors 40 and 50 on the sensor mast 30 via signal line 130. The additional components 140 may include an orientation apparatus (not shown) that provides orientation information about the apparatus's position in space. Exemplary embodiments of the orientation apparatus include accelerometers and various other mechanisms as commonly known in the art. Alternative exemplary embodiments include configurations wherein the additional components 140 are omitted.

The sensors 40 and 50, the processor 110, the dual purpose, bi-directional haptic force feedback devices 63 and 65, the vibrator 67 and various other components 140 are powered by the power supply 120. The power supply 120 may be a battery, a fuel cell or various other components as commonly known in the art.

Analog information from the ultrasonic sensors 40 and the infrared sensors 50 is input to an analog to digital converter (not shown) before being sent to the processor 110. The processor 110 processes the converted signals from the sensors 40 and 50 to determine information about the surrounding environment. The processor 110 specifically interprets the signals received from the sensors 40 and 50 along signal line 130 to determine distances and directions to potential obstacles within the sensor ranges. The processor 110 then supplies the processed information to a digital to analog converter (not shown) before supplying the information to the dual purpose, bi-directional haptic force feedback devices 63 and 65 and the vibrator 67 to provide information about the surrounding environment to the user through tactile feedback. The handle positioner 70 allows a user to ensure consistent hand positioning with respect to the tactile pad 60.

Hereinafter an exemplary embodiment of a method of operating the apparatus 1 will be described with reference to FIGS. 5A-9B. FIGS. 5A-9A are schematic top down views illustrating steps in an exemplary embodiment of a method of operating the exemplary embodiment of an apparatus 1 according to the present invention and FIGS. 5B-9B are bottom perspective views of the exemplary embodiment of the apparatus 1 according to the steps in the exemplary embodiment of a method of operating the exemplary embodiment of an apparatus 1 according to the present invention.

Figure 5A:
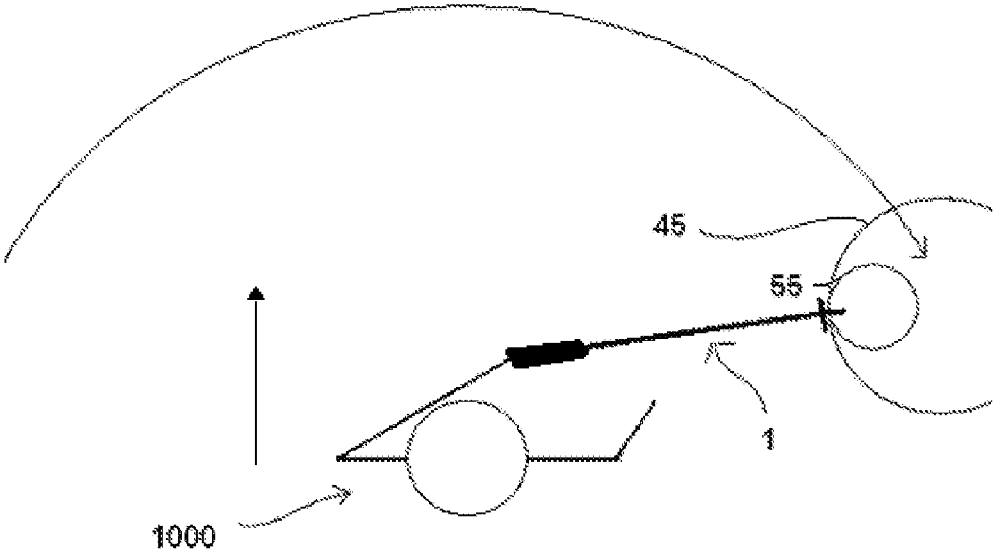
FIGS. 5A, 6A, 7A, 8A and 9A are top perspective views illustrating a first, second, third, fourth and fifth step, respectively, in an exemplary embodiment of a method of operating the exemplary embodiment of an apparatus according to the present invention.
Figure 5B:
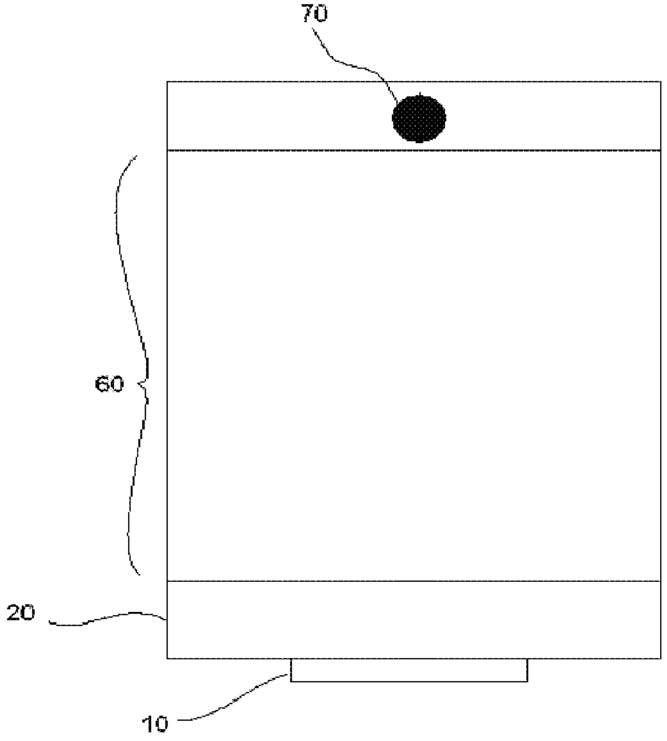
FIGS. 5B, 6B, 7B, 8B and 9B are schematic bottom perspective views of the exemplary embodiment of the apparatus according to the first, second, third, fourth and fifth step, respectively, in the exemplary embodiment of a method of operating the exemplary embodiment of an apparatus according to the present invention.

FIGS. 5A-9B illustrate an exemplary embodiment of a method of operating the exemplary embodiment of an apparatus 1 according to the present invention wherein a user 1000 is approaching and subsequently maneuvering within a hallway with sides 200A and 200B and maneuvering around an obstacle 300. Referring now to FIGS. 1 and 5A-B, a user 1000 performs an initial setup process by placing the tip of the apparatus 1 on the ground and pressing the reset button 80 on the handle 20. This prepares the apparatus 1 to begin receiving spatial information about its surroundings. The apparatus 1 may signal that it is ready to begin receiving spatial information by briefly operating the vibrator 67.

The user 1000 then sweeps the apparatus 1 in a left-to-right and right-to-left motion, similar to the motion used in a conventional mobility cane. However, unlike the conventional mobility cane, the exemplary embodiment of an apparatus 1 is not required to physically contact the ground or other objects surrounding the user 1000.

As shown in FIG. 5A, the user 1000 navigates open ground with no obstacles. The user 1000 moves forward in the direction indicated by the arrow and the sensors 40 and 50 individually output their respective signals 45 and 55. However, in open ground there are no obstacles to reflect the respective signals and no reflections are transmitted back to the sensors 40 and 50. The sensors 40 and 50 then transmit the reflection information to the processor 110. The processor 110 interprets the reflection information as the absence of obstacles and therefore does not activate either of the dual purpose, bi-directional haptic devices 63 or 65, nor does it activate the vibrator 67, as shown in FIG. 3.

Figure 6A:
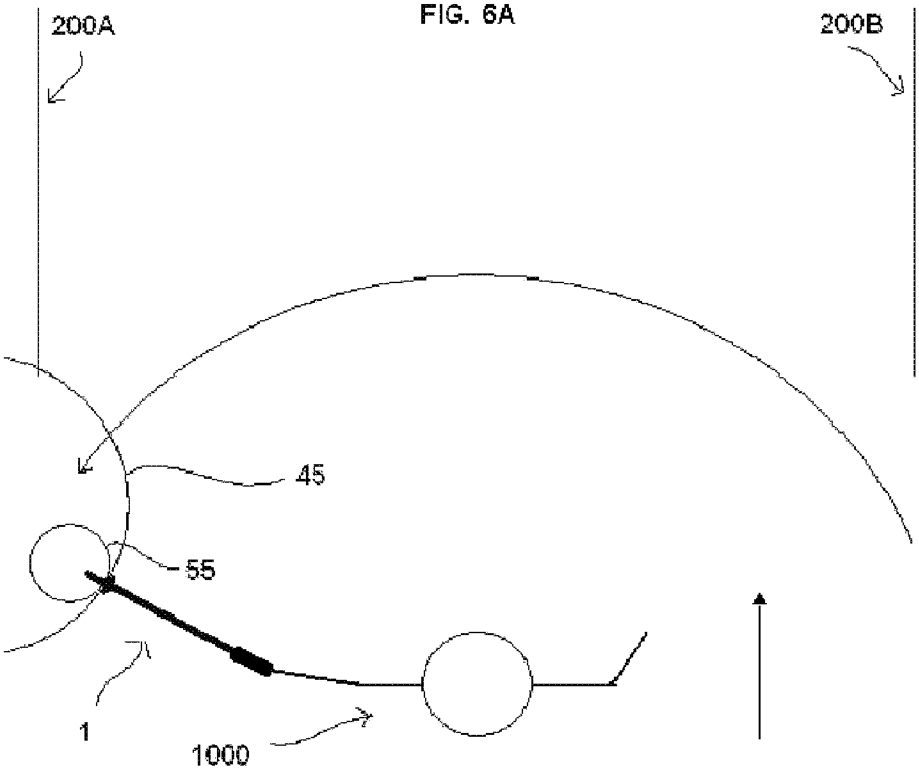

Next, the user 1000 continues moving in a direction as indicated by the arrow in FIG. 5A until encountering the environment shown in FIG. 6A. As shown in FIG. 6A, the user 1000 encounters the wall 200A at the end of a sweep to the left. The sensors 40 and 50 detect reflections of their individually output signals 45 and 55 from the wall 200A. The sensors 40 and 50 send the reflection information to the processor 110 which interprets the received reflections as the presence of a solid object.

The processor can determine the direction of motion of an object relative to the apparatus 1; this is especially facilitated by offsetting individual sensors of the sensors 40 and 50. As shown in FIG. 6A, the wall 200A is first detected by the second ultrasonic sensor 40*b* which is offset to the left of the sensor mast 30. The wall 200A is then subsequently detected by the second ultrasonic sensor 40*b*. The processor 110 is able to determine that the object has moved from the leftmost sensor range into a middle, or overlapping, sensor range and therefore the apparatus 1 is moving in a right-to-left motion. The processor 110 determines the direction of the motion and outputs the processed information to the dual purpose, bi-directional haptic force feedback devices 63 and 65 connected to the tactile pad 60. The user 1000 then interprets the force feedback and vibration of the apparatus 1, or the lack thereof, as distance information to an obstacle.

In the current exemplary embodiment, on a sweep from right to left, as illustrated in FIG. 6A, the processor 110 instructs the second bi-directional haptic force feedback device 65 to induce a rightward directional force feedback and instructs the vibrator 67 to emit a muted vibration when the detected object moves from the leftmost sensor range into the middle sensor range. The processor 110 continues to instruct the second bi-directional haptic force feedback device 65 to induce a rightward directional force feedback and instructs the vibrator 67 to emit a muted vibration when the object is detected in the combined sensor range.

When the apparatus 1 includes the exemplary embodiment of the second bi-directional haptic force feedback device 65 as shown in FIG. 2B, the second bi-directional haptic force feedback device 65 may induce the rightward directional force by accelerating the weighted portion 656 rapidly from a starting position towards the right. The second bi-directional haptic force feedback device 65 may then relatively slowly retract the weighted portion to the starting position in order to be prepared to induce additional rightward directional force feedback. The first bi-directional haptic force feedback device 63 may induce a leftward directional force in a similar manner by accelerating another weighted portion towards the left.

Similarly, on a sweep from the left to the right, as will be discussed in more detail with respect to FIG. 7A, the processor 110 instructs the first bi-directional haptic force feedback device 63 to induce a relatively small leftward directional force feedback and instructs the vibrator 67 to emit a muted vibration when the detected object moves from the rightmost sensor range into the combined sensor range. In addition, the processor 110 continues to instruct the first bi-directional haptic force feedback device 63 to induce a relatively small leftward directional force feedback and instructs the vibrator 67 to emit a muted vibration when the object is detected in the combined sensor range. Alternative exemplary embodiments also include configurations wherein the processor 110 instructs both of the bi-directional haptic force feedback devices 63 and 65 to induce both leftward and rightward directional forces when an object is detected in the combined sensor range.

In one exemplary embodiment, the processor 110 may instruct the bi-directional haptic force feedback devices 63 and 65 to induce directional forces with a greater or lesser intensity depending upon which sensor detects a reflected signal. In one exemplary embodiment, the processor 110 instructs the bi-directional haptic force feedback devices 63 and 65 to induce directional forces at a lower intensity when only the ultrasonic sensor 40 detects reflections and instructs the bi-directional haptic force feedback devices 63 and 65 to induce directional force at a greater intensity when the infrared sensor 50 detects reflections, as will be discussed in more detail with respect to FIG. 8B below. Alternative exemplary embodiments include configurations wherein the bi-directional haptic devices 63 and 65 are configured to induce directional forces with a single intensity.

When the apparatus 1 includes the exemplary embodiment of the second bi-directional haptic force feedback device 65 as shown in FIG. 2B, the bi-directional haptic force feedback device 65 may induce a rightward directional force with greater intensity by increasing the acceleration of the weighted portion 656 from a starting position towards the right. The bi-directional force feedback device 65 may then induce a rightward directional force with lesser intensity by decreasing the acceleration of the weighted portion 656 from a starting point towards the right. The same process may be repeated in the opposite direction with the first bi-directional haptic force feedback device 63. In the alternative exemplary embodiment wherein only one bi-directional force feedback device is used, the acceleration of a single weighted portion in the leftward or rightward directions may provide different force feedback intensities depending upon the leftward or rightward acceleration of that weighted portion.

Similarly, the processor 110 may instruct the vibrator to emit a vibration with a greater or lesser intensity depending upon which sensor detects a reflected signal. In one exemplary embodiment, the processor 110 instructs the vibrator 67 to vibrate at a lower intensity when only the ultrasonic sensor 40 detects reflections and instructs the vibrator 67 to vibrate at a greater intensity when the infrared sensor 50 detects reflections, as will be discussed in more detail with respect to FIG. 8B below. Alternative exemplary embodiments include configurations wherein the vibrator is configured to vibrate with a single intensity.

Alternative exemplary embodiments include configurations wherein the processor 110 determines the direction of motion and or the orientation of the apparatus 1 from an orientation apparatus such as an accelerometer in conjunction with, or instead of, the motion sensing method described above. In one exemplary embodiment, the bi-directional haptic devices 63 and 65 receive real-time instructions from the processor 110, thereby allowing for real-time display of three-dimensional environmental information.

Figure 6B:
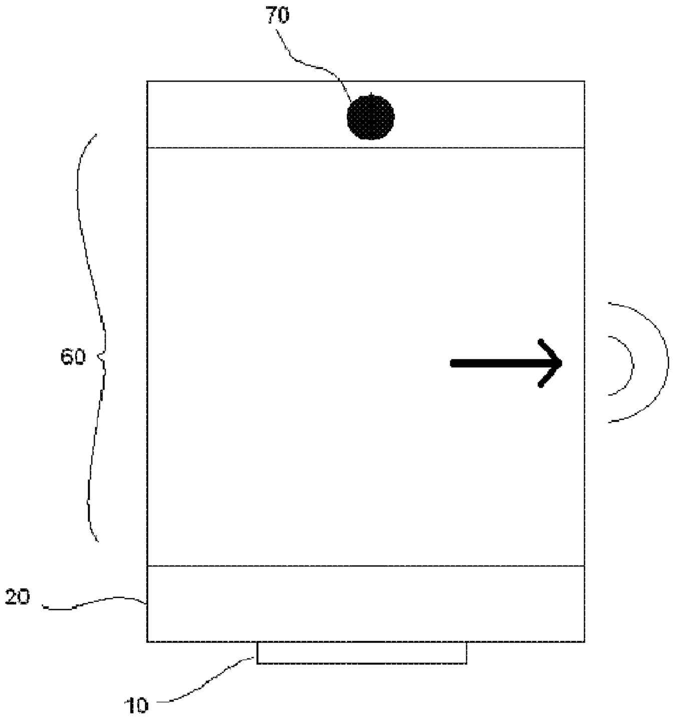

FIG. 6B illustrates that in response to the processed reflection information, the processor 110 outputs instructions corresponding to the received reflections from the sensors 40 and 50 to the bi-directional haptic force feedback devices 63 and 65. The processor 110 determines that the wall 200A entered the leftmost ultrasonic sensor range, but not the infrared sensor ranges, and therefore the processor instructs the second bi-directional haptic device 65 to induce a rightward force with a relatively low intensity and instructs the vibrator 67 to vibrate with a relatively low intensity. The user 1000 then interprets the rightward force and vibration of the apparatus 1 through the tactile pad 60 as distance information to an obstacle.

Figure 7A:
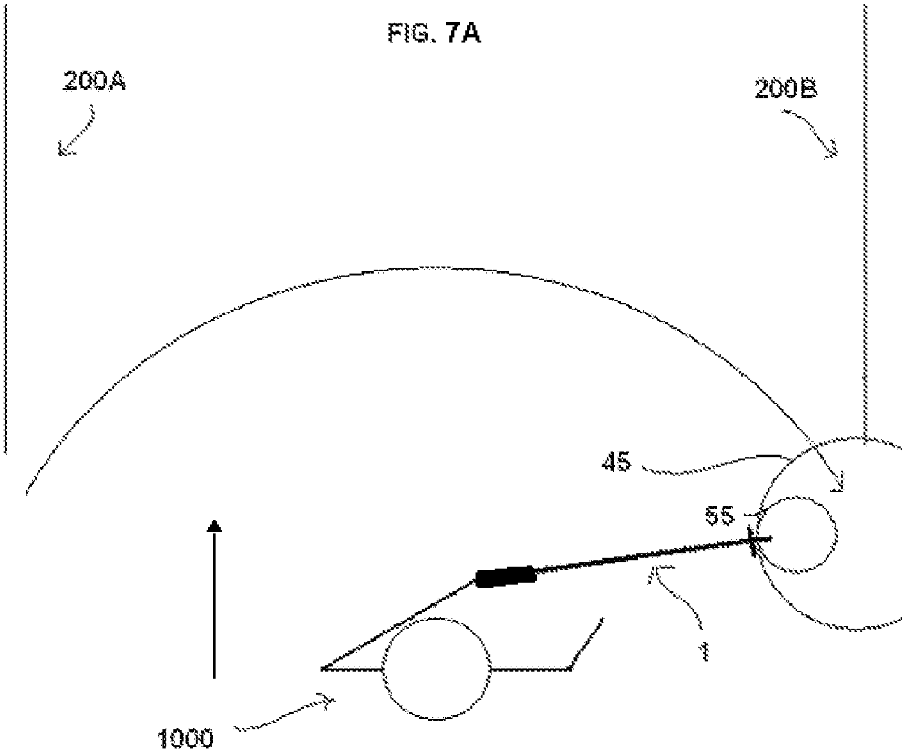

In the environment shown in FIG. 7A, the user 1000 encounters the wall 200B at the end of a sweep to the right while moving in a forward direction as indicated by the arrow. The sensor 40 detects reflections of it's individually output signals from the wall 200B. The sensors 40 and 50 send the reflection information 45 and 55 to the processor 110 which interprets the received reflections as the presence of a solid object and instructs the bi-directional haptic force feedback device 63 to activate a muted leftward directional force feedback and muted vibration accordingly. In the environment shown in FIG. 7A, only the ultrasonic sensor 40 detects reflections from its output signals 45 and 55 from the wall 200B.

Figure 7B:
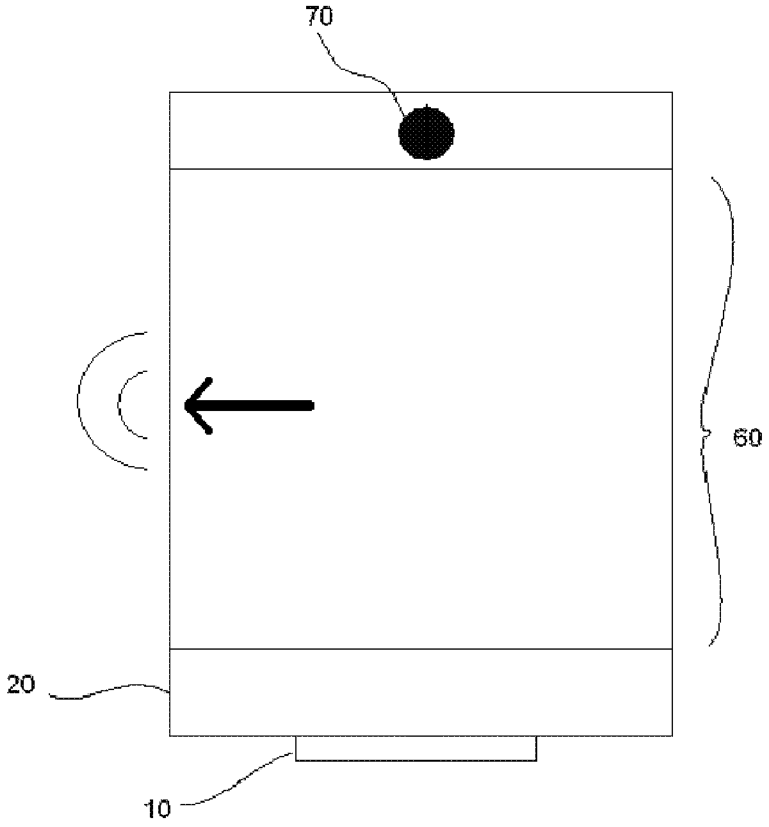

FIG. 7B illustrates that in response to the processed reflection information, the processor 110 outputs instructions corresponding to the received reflections from the sensors 40 and 50 to the bi-directional haptic force feedback devices 63 and 65. The processor 110 determines that the wall 200B entered the rightmost ultrasonic sensor range, but not the infrared sensor ranges, and therefore the processor instructs the first bi-directional haptic device 63 to induce a leftward force and instructs the vibrator 67 to vibrate with a relatively low intensity. The user 1000 then interprets the leftward force and vibration of the apparatus 1 through the tactile pad 60 as distance information to an obstacle.

Figure 8A:
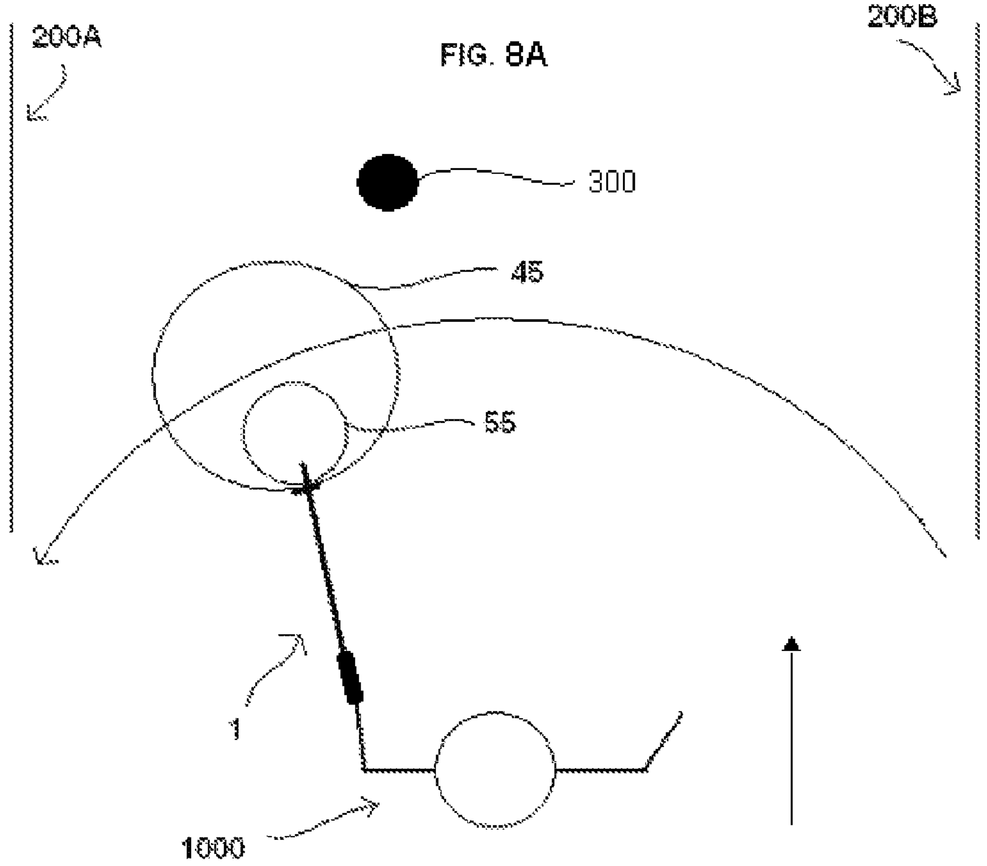
Figure 8B:
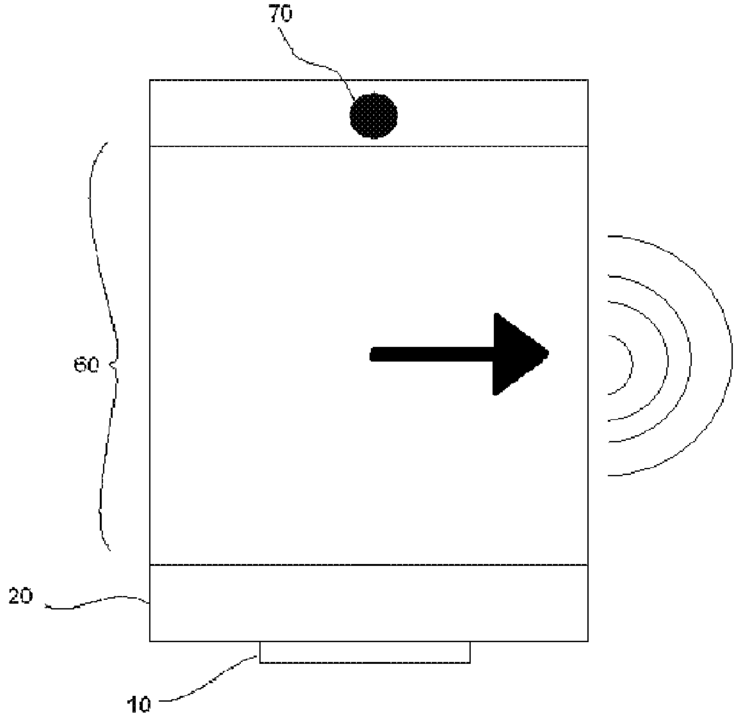

Referring now to FIGS. 8A and 8B the user 1000 again sweeps the apparatus 1 to the left while moving in a forward motion as indicated by the arrow. The sensors 40 and 50 continue to detect reflections of their output signals 45 and 55 and send that information to the processor 110. The processor 110 then instructs the bi-directional haptic force feedback and vibration devices accordingly. An obstacle 300, such as a column, is present in the schematic top down view of FIG. 8A; however, the object 300 is not yet within range of the sensors 40 and 50 and so its presence is not detected by the apparatus 1.

FIG. 8B illustrates that in response to the processed reflection information, the processor 110 outputs instructions corresponding to the received reflections from the sensors 40 and 50 to the bi-directional haptic force feedback devices 63 and 65. The processor 110 determines that the wall 200A entered the leftmost ultrasonic sensor range and the leftmost infrared sensor range, and therefore the processor instructs the second bi-directional haptic force feedback device 65 to induce a rightward force and instructs the vibrator 67 to vibrate with a relatively high intensity. The user 1000 then interprets the force-feedback and vibration of the apparatus 1 through the tactile pad 60 as distance information to an obstacle.

Figure 9A:
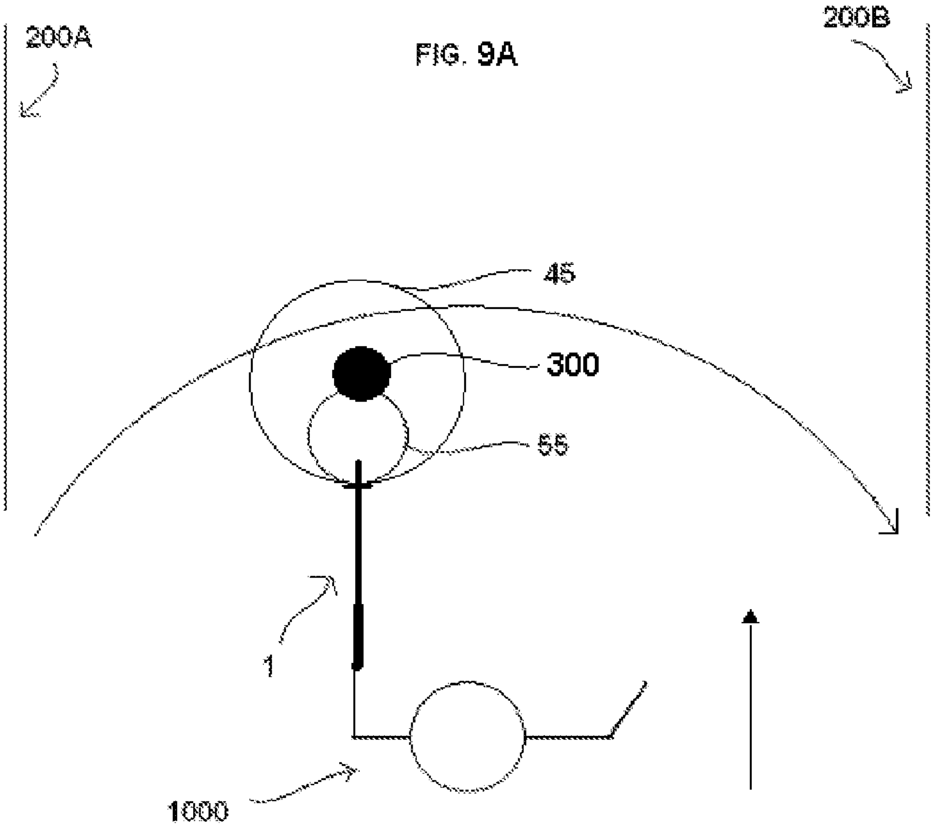
Figure 9B:
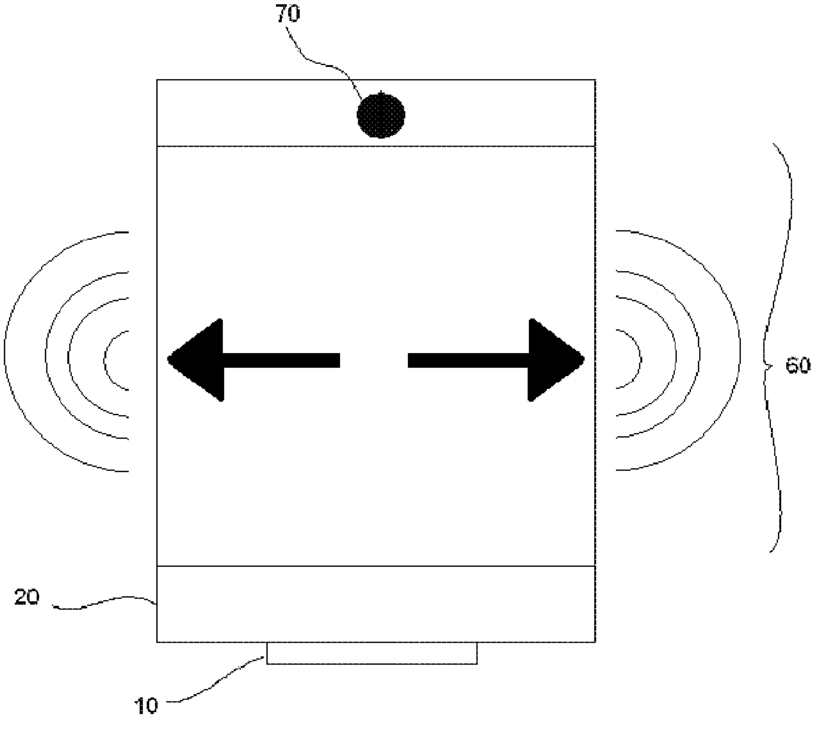

Referring now to FIGS. 9A and 9B the user 1000 again sweeps the apparatus 1 to the right while moving in a forward motion as indicated by the arrow. The sensors 40 and 50 continue to detect reflections of their output signals 45 and 55 and send that information to the processor 110. The processor 110 then instructs the bi-directional haptic force feedback and vibration devices accordingly. The obstacle 300 is now within range of the sensors 40 and 50 and the apparatus 1 detects its presence.

FIG. 9B illustrates that in response to the processed reflection information, the processor 110 outputs instructions corresponding to the received reflections from the sensors 40 and 50 to the bi-directional haptic force feedback devices 63 and 65. The processor 110 determines that the obstacle 300 entered the rightmost ultrasonic sensor range and the rightmost infrared sensor range and that the obstacle 300 is currently disposed in the middle sensor ranges directly in front of the apparatus 1. Therefore, the processor 110 instructs both bi-directional haptic force feedback devices 63 and 65 to induce leftward and rightward directional forces and instructs the vibrator 67 to vibrate with a relatively high intensity. The user 1000 then interprets the force feedback and vibration of the apparatus 1 through the tactile pad 60 as distance information to an obstacle. Alternatively, the processor 110 may instruct the bi-directional haptic force feedback devices 63 and 65 to not induce directional forces when the object 300 is directly in front of the apparatus 1.

While one exemplary embodiment of a method of using the apparatus 1 has been described with relation to FIGS. 5A-9B additional exemplary embodiments are within the scope of the present invention. The apparatus 1 may be used in substantially any terrain and the method of operation may be modified accordingly. In one exemplary embodiment the apparatus 1 may be used to detect the presence of stairs along the user 1000's path. In another exemplary embodiment the apparatus 1 may be used to detect holes or depressions in the ground along the user 1000's path. In the exemplary embodiments wherein the apparatus 1 detects changes in elevation along the path of the user 1000, such as stairs or depressions, etc., the processor 110 may activate an additional haptic force feedback and vibration device (not shown), or may operate the existing bi-directional haptic force feedback devices 63 and 65 and/or vibrator 67 in short pulses as an additional source of feedback information to the user 1000. Additional feedback mechanisms may be added to the apparatus 1 as would be known to one of ordinary skill in the art.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for providing information about a physical surrounding environment to a user, the apparatus comprising:

an elongate body having first and second opposing ends and a mast extending transversely from a body centerline at a location thereof proximate to the first end, the second end being handled by the user to repeatedly and continuously sweep the first end in first and second opposite motions;

at least one sensor mountably coupled to the mast of the body;

at least one dual purpose, bi-directional haptic force feedback device coupled to the body proximate to the second end and including first and second haptic force feedback mechanisms and a vibrator; and a processor, which is coupled to the body intermediate the mast and the at least one dual purpose, bi-directional haptic force feedback device, and which receives signals from the at least one sensor and operatively controls the at least one dual purpose, bi-directional haptic force feedback device to:

convey a first type of information about the physical surrounding environment sensed by the at least one sensor during the sweeping of the first end in the first and second motions by operating the vibrator and the first or the second haptic force feedback mechanisms, respectively, and convey a second type of information about the physical surrounding environment sensed by the at least one sensor during the sweeping of the first end in the first or second motions by operating the vibrator, the first and the second haptic force feedback mechanisms.

2. The apparatus of claim 1, wherein the at least one sensor comprises at least one ultrasonic sensor.

3. The apparatus of claim 2, wherein the at least one sensor further comprises at least one infrared sensor.

4. The apparatus of claim 3, wherein the at least one ultrasonic sensor comprises a first and second ultrasonic sensor and the at least one infrared sensor comprises a first, second and third infrared sensor.

5. The apparatus of claim 4, wherein the first and second ultrasonic sensors are offset from one another with respect to a centerline of the body.

6. The apparatus of claim 4, wherein the first infrared sensor is disposed to the left of a centerline of the body, the second infrared sensor is disposed substantially on the centerline of the body and the third infrared sensor is disposed to the right of the centerline of the body.

7. The apparatus of claim 1, wherein the first haptic force feedback mechanism and second haptic force feedback mechanism are offset from one another with respect to a centerline of the body.

8. The apparatus of claim 1, wherein the first and second haptic force feedback mechanisms each individually comprise:

a motor including a driveshaft;

a bevel gear system connected to the driveshaft a linkage mechanism rotatably connected to the bevel gear system;

a connecting rod connected to the linkage mechanism; and a weighted portion disposed on the connecting rod.

9. The apparatus of claim 1, wherein the first and second haptic force feedback mechanisms are each configured to have a variable intensity of directional force application.

10. The apparatus of claim 9, wherein the processor operatively controls the intensity of directional force of the first and second haptic force feedback mechanisms to convey distance information.

11. The apparatus of claim 1, wherein the body comprises a cane.

12. A method of providing information about a physical surrounding environment to a user provided with an elongate body having first and second opposing ends and a mast extending from a body centerline at a location proximate to the first end, the second end being handled by the user to repeatedly and continuously sweep the first end in first and second opposite motions, the method comprising:

transmitting at least one sensing signal emitted by a sensor mountably coupled to the mast to the physical surrounding environment;

receiving a modified sensing signal at the sensor during the sweeping from the physical surrounding environment; and controlling first and second haptic force feedback mechanisms coupled to the body proximate to the second end and a vibrator, the controlling being based on the modified sensing signal to:

convey a first type of information about the physical surrounding environment sensed during the sweeping of the first end in the first and second motions by operating the vibrator and the first or the second haptic force feedback mechanisms, respectively, and convey a second type of information about the physical surrounding environment sensed during the sweeping of the first end in the first or second motions by operating the vibrator, the first and the second haptic force feedback mechanisms.

13. The method of claim 12, wherein the transmitting at least one sensing signal to the environment further comprises transmitting at least one ultrasonic sensing signal and at least one infrared sensing signal.

14. The method of claim 13, wherein, the transmitting at least one ultrasonic sensing signal comprises transmitting two ultrasonic sensing signals, and the transmitting at least one infrared sensing signal comprises transmitting three infrared sensing signals.

15. The method of claim 14, wherein the controlling further comprises:

configuring the first haptic force feedback mechanism to output tactile information in a first direction; and configuring the second haptic force feedback mechanism to output tactile information in a second direction substantially opposite to the first direction.

16. The method of claim 15, wherein the controlling further comprises:

processing the received modified sensing signal to determine a location of an object relative to the first and second haptic force feedback devices;

instructing the first haptic force feedback mechanism to output tactile information in the first direction when the location of the object is determined to be to the right of the first haptic force feedback device; and instructing the second haptic force feedback mechanism to output tactile information in the second direction when the location of the object is determined to be to the left of the second haptic force feedback device.

17. The method of claim 16, wherein at least one of the processing the received modified sensing signal and the instructing the first and second haptic force feedback mechanisms are performed in real-time.

18. An apparatus for providing information about a physical surrounding environment to a user, the apparatus comprising:

an elongate body having a handle, a distal end a mast extending transversely from the distal end, the handle handled by the user to repeatedly and continuously sweep the distal end in opposite motions;

at least one sensor mountably coupled to the mast and operatively coupled to the handle;

first and second haptic force feedback mechanisms proximally coupled to the handle;

a vibrator proximally coupled to the handle; and a processor, which is coupled to the body intermediate the mast and the plurality of mechanisms, and which receives signals from the at least one sensor and controls force feedback of the plurality of mechanisms and vibration of the vibrator to:

convey a first type of information about the physical surrounding environment sensed by the at least one sensor during the sweeping in each of the opposite motions by operating the vibrator and the first or the second haptic force feedback mechanisms, respectively, and convey a second type of information about the physical surrounding environment sensed by the at least one sensor during the sweeping in both of the opposite motions by operating the vibrator, the first and the second haptic force feedback mechanisms.

* * * * *